(12) United States Patent
Nasrullah et al.

(10) Patent No.: US 10,725,524 B2
(45) Date of Patent: *Jul. 28, 2020

(54) METHOD AND SYSTEMS FOR ENERGY EFFICIENCY AND ENERGY CONSERVATION INCLUDING ON-OFF KEYING FOR POWER CONTROL

(71) Applicant: Intel Corporation, Santa Clara, CA (US)

(72) Inventors: Jawad Nasrullah, Palo Alto, CA (US); Kelvin Kwan, Santa Clara, CA (US); David Roger Ditzel, Los Altos Hills, CA (US); Vjekoslav Svilan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 691 days.

This patent is subject to a terminal disclaimer.

(21) Appl. No.: 15/059,186

(22) Filed: Mar. 2, 2016

(65) Prior Publication Data
US 2016/0179175 A1    Jun. 23, 2016

Related U.S. Application Data

(63) Continuation of application No. 13/333,759, filed on Dec. 21, 2011, now Pat. No. 9,280,190.

(51) Int. Cl.
*G06F 1/00* (2006.01)
*G06F 1/3234* (2019.01)
(Continued)

(52) U.S. Cl.
CPC ............. *G06F 1/3234* (2013.01); *G06F 1/26* (2013.01); *G06F 1/3203* (2013.01); *G06F 1/324* (2013.01);
(Continued)

(58) Field of Classification Search
CPC ........ G06F 1/3234; G06F 1/26; G06F 1/3203; G06F 1/3231; G06F 1/324; G06F 1/3296;
(Continued)

(56) References Cited

U.S. PATENT DOCUMENTS 9,280,190 B2 *   3/2016   Nasrullah ................. G06F 1/26
2003/0074591 A1 * 4/2003  McClendon ............ G06F 1/206
                                                                    713/322

(Continued)

OTHER PUBLICATIONS

Final Office Action from U.S. Appl. No. 13/333,759 dated Jun. 10, 2015, 18 pages.

(Continued)

*Primary Examiner* — Zhipeng Wang
(74) *Attorney, Agent, or Firm* — Nicholson De Vos Webster & Elliott LLP (57) ABSTRACT

Systems and a method for controlling power of a device with power management software are described. In one embodiment, a computer implemented method initiates power control having ON-OFF keying to control power consumption of a device for energy efficiency and energy conservation. An ON-OFF period of the ON-OFF keying for the device is computed. The method sets a target frequency, a target supply voltage, and a power gate control for the device based on the ON-OFF keying.

11 Claims, 10 Drawing Sheets

(51) Int. Cl.
*G06F 1/3203* (2019.01)
*G06F 1/3231* (2019.01)
*G06F 1/324* (2019.01)
*G06F 1/3296* (2019.01)
*G06F 1/26* (2006.01)

(52) U.S. Cl.
CPC .......... *G06F 1/3231* (2013.01); *G06F 1/3296* (2013.01); *Y02D 10/126* (2018.01); *Y02D 10/172* (2018.01); *Y02D 10/173* (2018.01)

(58) Field of Classification Search
CPC ... Y02D 10/126; Y02D 10/172; Y02D 10/173
See application file for complete search history.

(56) References Cited

U.S. PATENT DOCUMENTS

| | | | | |
|---|---|---|---|---|
| 2005/0218943 A1* | 10/2005 | Padhye | ................. | G06F 1/3203 327/109 |
| 2008/0162770 A1* | 7/2008 | Titiano | ................. | G06F 1/3203 710/309 |
| 2010/0060342 A1* | 3/2010 | Rozen | ................. | H03K 19/0016 327/535 |
| 2010/0202235 A1* | 8/2010 | Priel | .............. | G01B 31/318533 365/226 |
| 2011/0022869 A1* | 1/2011 | Rozen | ................... | G06F 1/3203 713/324 |
| 2012/0054511 A1* | 3/2012 | Brinks | ...................... | G06F 1/26 713/310 |
| 2012/0166842 A1* | 6/2012 | Sur | ......... | G06F 1/206 713/323 |
| 2013/0015904 A1* | 1/2013 | Priel | ..................... | G06F 1/3203 327/419 |
| 2013/0222359 A1* | 8/2013 | Nakata | ................. | G09G 3/3614 345/212 |

OTHER PUBLICATIONS

Final Office Action from U.S. Appl. No. 13/333,759 dated Oct. 9, 2014, 8 pages.
Non-Final Office Action from U.S. Appl. No. 13/333,759 dated Feb. 5, 2015, 10 pages.
Non-Final Office Action from U.S. Appl. No. 13/333,759 dated May 20, 2014, 8 pages.
Notice of Allowance from U.S. Appl. No. 13/333,759, dated Oct. 28, 2015, 5 pages.

* cited by examiner

METHOD AND SYSTEMS FOR ENERGY EFFICIENCY AND ENERGY CONSERVATION INCLUDING ON-OFF KEYING FOR POWER CONTROL

TECHNICAL FIELD

Embodiments of the invention relate to a method and systems for energy efficiency and energy conservation including on-off keying for power control.

BACKGROUND

Power management techniques for computer systems and processors typically use dynamic voltage and frequency scaling. These techniques are limited by the lowest operating values of voltage and frequency. For example, one technique includes dynamic voltage and frequency scaling. This technique is limited by a minimum voltage level (Vmin) and a minimum frequency (Fmin) Another technique includes frequency only scaling at a fixed voltage. This technique is also limited by a Vmin and Fmin Another technique includes software-generated requests for idle states, without direct control of voltage, other hardware parameters, and without a guarantee of the physical state that will result. The operating system is the software that generates the requests for idle states.

Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, ultrabooks, tablets, mobile phones, processors, embedded systems, etc. become even more prevalent (from inclusion in the typical computer, automobiles, and televisions to biotechnology).

BRIEF DESCRIPTION OF THE DRAWINGS

The various embodiments of the present invention are illustrated by way of example, and not by way of limitation, in the figures of the accompanying drawings and in which.

DETAILED DESCRIPTION

Systems and a method for controlling power of a device to reduce power consumption with power management software are described. In one embodiment, a computer implemented method initiates power control software having ON-OFF keying to control and reduce power consumption of a device in an energy-efficient manner. An ON-OFF period of the ON-OFF keying for the device is computed. The method sets a target frequency, a target supply voltage, and a power gate control for the device based on the ON-OFF keying. Embodiments of this invention provide a power architecture with a software/hardware co-design. The software controls the operation with an ON-OFF keying sequence on power gates of the hardware. The ON-OFF keying sequence modulates the power consumption and enables a lower power energy-efficient operation than is otherwise possible with prior techniques. In an embodiment, this design provides a single operating point design having a single frequency and a single voltage.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that embodiments of the invention may be practiced without such specific details. In other instances, control structures and gate level circuits have not been shown in detail to avoid obscuring embodiments of the invention. Those of ordinary skill in the art, with the included descriptions, will be able to implement appropriate logic circuits without undue experimentation.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a micro-controller, or the like. The interconnect between chips each could be point-to-point or each could be in a multi-drop arrangement, or some could be point-to-point while others are a multi-drop arrangement.

Figure 1:
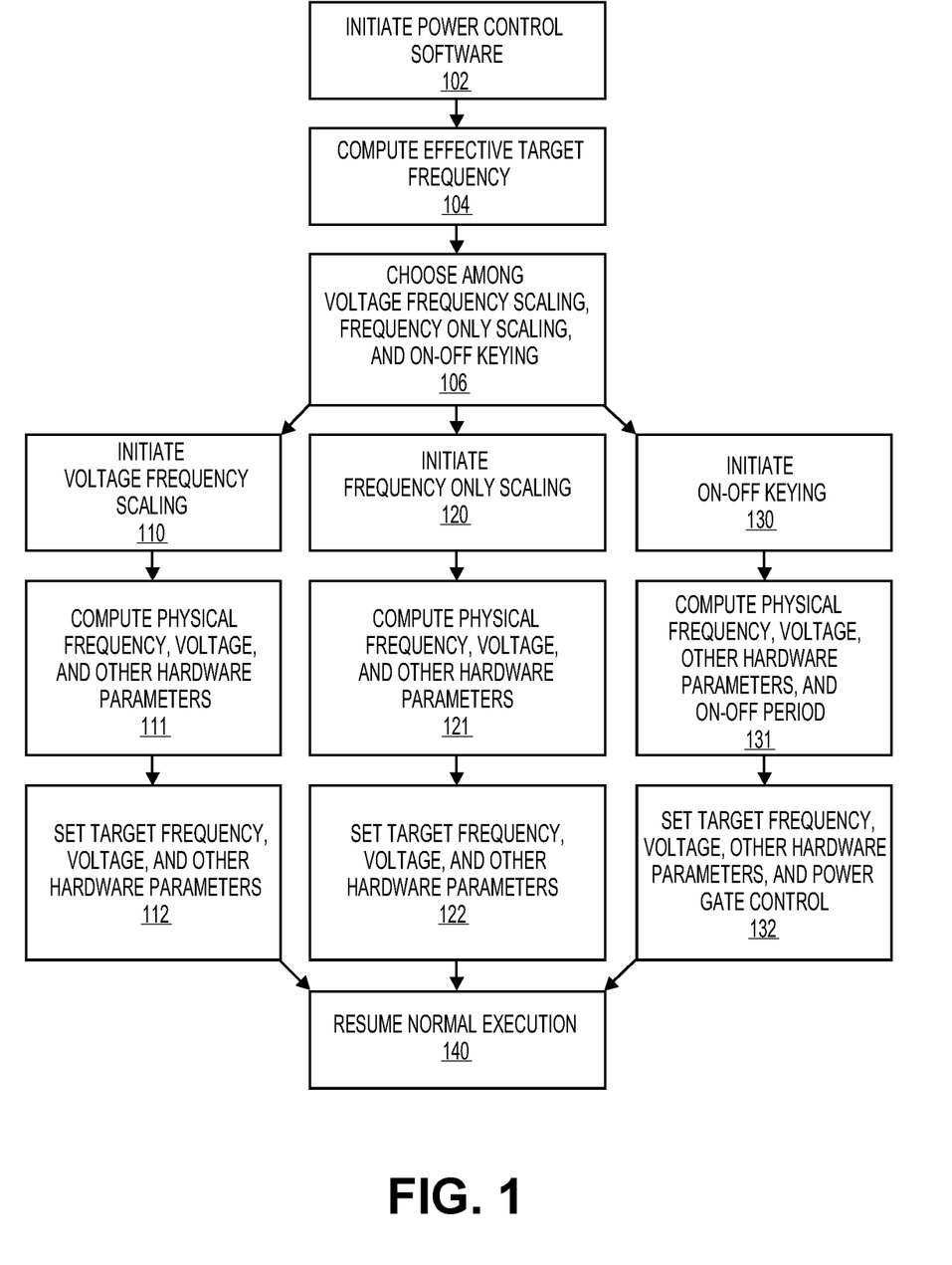
FIG. 1 illustrates a flow diagram of one embodiment for a computer-implemented method of controlling power of a device to reduce power consumption in accordance with one embodiment of the invention.

FIG. 1 illustrates a flow diagram of one embodiment for a computer-implemented method 100 of controlling power of a device to reduce power consumption in accordance with one embodiment. The method 100 is performed by processing logic that may comprise hardware (circuitry, dedicated logic, etc.), software (such as is run on a general purpose computer system or a dedicated machine or a device), or a combination of both. In one embodiment, the method 100 is performed by processing logic associated with the devices or systems discussed herein.

At block 102, the processing logic initiates or invokes power control using power control software to operate the device in an energy-efficient manner. For example, the power control software may be associated with or located on a processor core or microcontroller. The processing logic computes an effective target frequency for a device based on one or more inputs at block 104. For example, the one or more inputs may include environmental sensors, silicon age monitors, etc. The one or more inputs may include power and other hardware monitors, platform and external hardware (e.g., input/output (I/O devices), workload monitor, idle monitor, and user input. A low power mode may limit the target frequency to a different (lower) target frequency than a normal power mode. At block 106, the processing logic selects a power control method among various different power control methods. For example, these methods may include voltage frequency scaling, frequency only scaling, and ON-OFF keying. One of these methods is selected based on at least one of voltage and frequency conditions, the effective target frequency, and inputs that have been received. Alternatively, a default power control method may be selected or predetermined. In one embodiment, for a Vmin condition, the ON-OFF keying method is selected or used as a default. The ON-OFF keying method for Vmin and possibly other operating conditions as well (e.g., voltages greater than Vmin for a cost sensitive design or power limited design) provides a reduced leakage power during the OFF condition. Thus, the ON-OFF keying method provides less power consumption and more energy-efficiency in comparison to other power control methods.

At block 130, the power control with the ON-OFF keying method is initiated based on its selection or default selection at block 106. At block 131, the processing logic computes physical frequency and supply voltage for the device, other hardware parameters, and an ON-OFF period for the ON-OFF keying. At block 132, the processing logic sets the target frequency and target supply voltage for the device, other hardware parameters, and power gate control based on the ON-OFF keying. The physical frequency and supply voltage of the device may be adjusted to the target frequency and target supply voltage for the device. In one embodiment, the target frequency and target supply voltage are set as a single point design with the ON-OFF keying. At block 140, the device resumes normal execution.

Alternatively, at block 110, the voltage frequency scaling method is initiated based on its selection at block 106. At block 111, the processing logic computes physical frequency and voltage for the device and other hardware parameters. At block 112, the processing logic sets the target frequency and voltage for the device and other hardware parameters. At block 140, the device resumes normal execution.

Alternatively, at block 120, the frequency only method is initiated based on its selection at block 106. At block 121, the processing logic computes physical frequency and voltage for the device and other hardware parameters. At block 122, the processing logic sets the target frequency and voltage for the device and other hardware parameters. At block 140, the device resumes normal execution.

Figure 2:
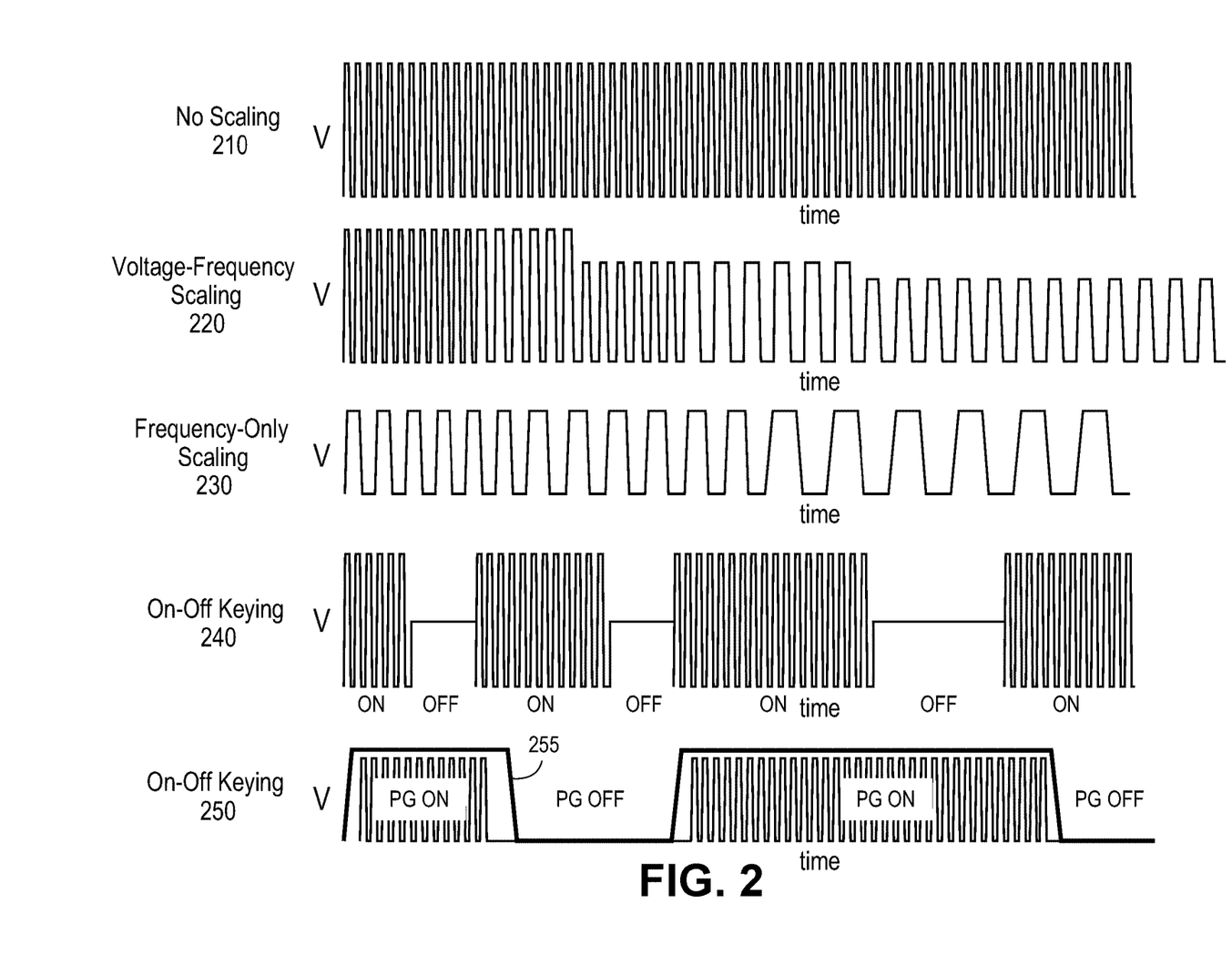
FIG. 2 illustrates exemplary power control waveforms associated with power control methods in accordance with one embodiment of the invention.

FIG. 2 illustrates exemplary power control waveforms associated with power control methods in accordance with one embodiment of the invention. The waveforms 210, 220, 230, 240, and 250 each represent voltage on a vertical axis and time on a horizontal axis. The waveform 210 provides no scaling and is provided as a reference waveform. The waveform 220 provides a voltage frequency scaling method that scales both voltage and frequency. The waveform 230 provides a frequency only scaling method that scales only frequency given a Vmin. The waveform 240 provides an ON-OFF keying method that modulates between ON and OFF. The waveform 250 provides another example of an ON-OFF keying method that modulates between ON and OFF conditions for power gates as indicated by the waveform 255.

Figure 3:
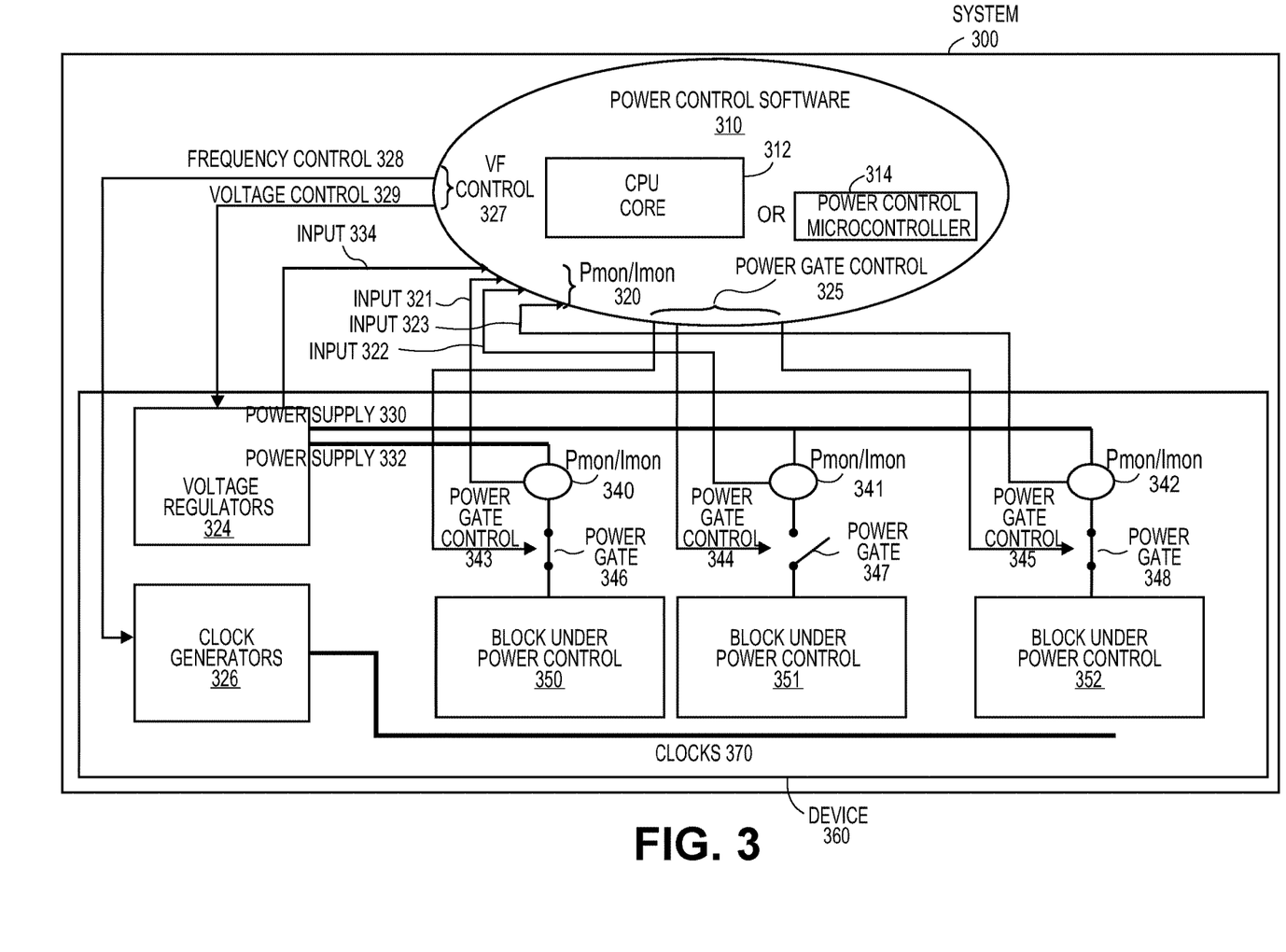
FIG. 3 illustrates a block diagram of a system having power control in accordance with one embodiment of the invention.

FIG. 3 illustrates a block diagram of a system 300 having power control in accordance with one embodiment of the invention. The system 300 includes power control software 310 that can be stored on or associated with a CPU core 312 or a power control microcontroller 314. For a CPU core 312, the power control software 310 may be firmware (e.g., code morphing software) that functions as an intermediate layer between a guest instruction set architecture (ISA) (e.g., x86 based instructions) and a host ISA. Alternatively, the microcontroller 314 may store the power control software 310. The power control software 310 receives one or more inputs 334 from voltage regulators 324 that are based on voltages of the power supply 330 and power supply 332. The power or current monitor control 320 receives inputs 321-323 from power or current monitors 340-342, respectively. The inputs 321-323 are used to determine whether the power gates 346-348 are open or closed. The power gate control 325 generates outputs, power gate controls 343-345, to control the position of the power gates 346-348, respectively. The VF control 327 generates outputs, frequency control 328 and voltage control 329, to control the frequency of the clock generators 326 and voltage of the voltage regulators 324, respectively. The clocks 370 are provided to various blocks 350-352 of the device 360 that is under power control. The voltage regulators 324 may also be located off-chip rather than on the device.

Figure 4:
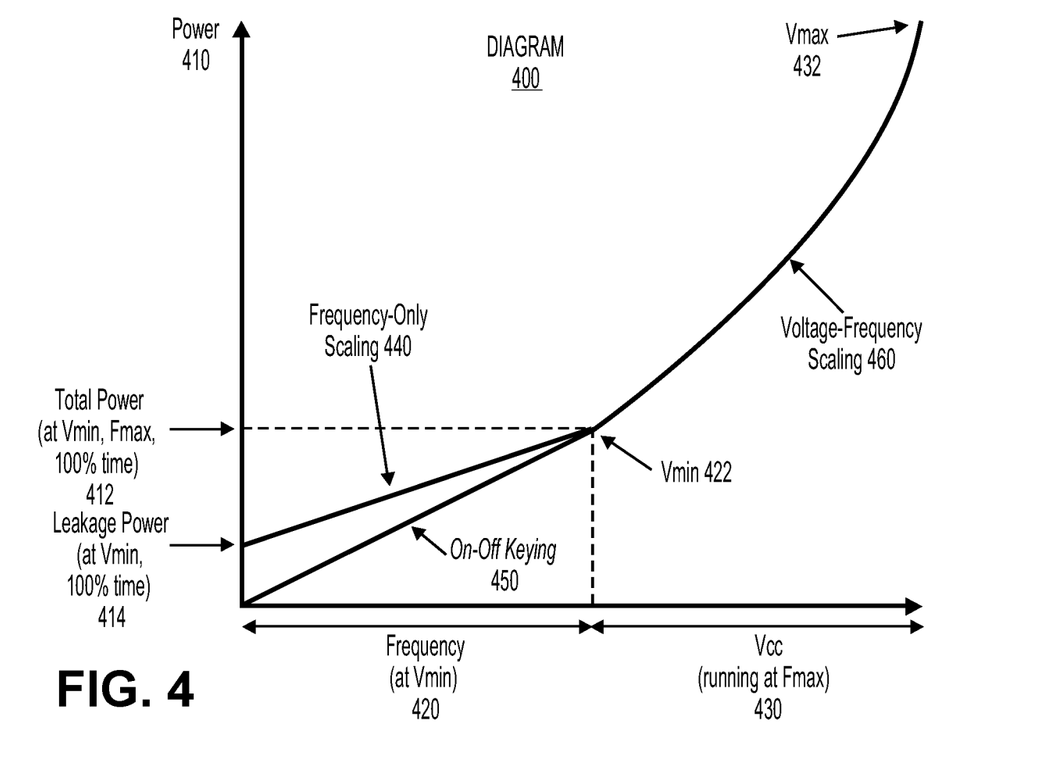
FIG. 4 illustrates a diagram of power versus frequency and voltage for one embodiment of the invention.

FIG. 4 illustrates a diagram of power versus frequency and voltage for one embodiment of the invention. The diagram 400 includes power on a vertical axis and frequency 420 and power supply voltage (Vcc) 430 on a horizontal axis. For the Vcc 430 portion of the horizontal axis, the device operates at a maximum frequency (Fmax) and the voltage is increased from Vmin 422 to Vmax 432. The curved line 460 extends from Vmin 422 to Vmax 432. A voltage frequency scaling method (e.g., waveform 220) is applied to generate the curved line 460. The power is reduced significantly along the curve 460 in moving from Vmax 432 to Vmin 422.

For the frequency 420 portion of the horizontal axis, the device operates at a minimum voltage (Vmin) and frequency decreases in moving from Fmax to a minimum frequency. The segment 440 extends from Vmin 422 to leakage power 414. A frequency only scaling method (e.g., waveform 230) is applied to generate the segment 440. A voltage frequency scaling method would be reduced to the frequency only scaling method because the voltage is fixed at Vmin. The power is reduced moderately along the segment 440 in moving from Vmin 422 to leakage power 414. However, the power can not be lowered below leakage power 414 with the frequency only scaling because the device is operating in an ON condition 100% of the time and thus has leakage 100% of this time.

The ON-OFF keying segment 450 extends from Vmin 422 to zero. The ON-OFF keying method (e.g., waveform 240, 250) is applied to generate the segment 450. The power is reduced significantly along the segment 450 in moving from Vmin 422 to zero. Thus, the ON-OFF keying segment 450 reduces the power consumption of a device in comparison to the frequency only scaling because the device is operating in an ON condition 100% of the time for the frequency only scaling method while the device is operating in an ON condition for a fraction of the time (e.g., 25%, 50%, 75%, etc.) for the ON-OFF keying method as illustrated by waveform 255 and diagram 400.

Figure 5:
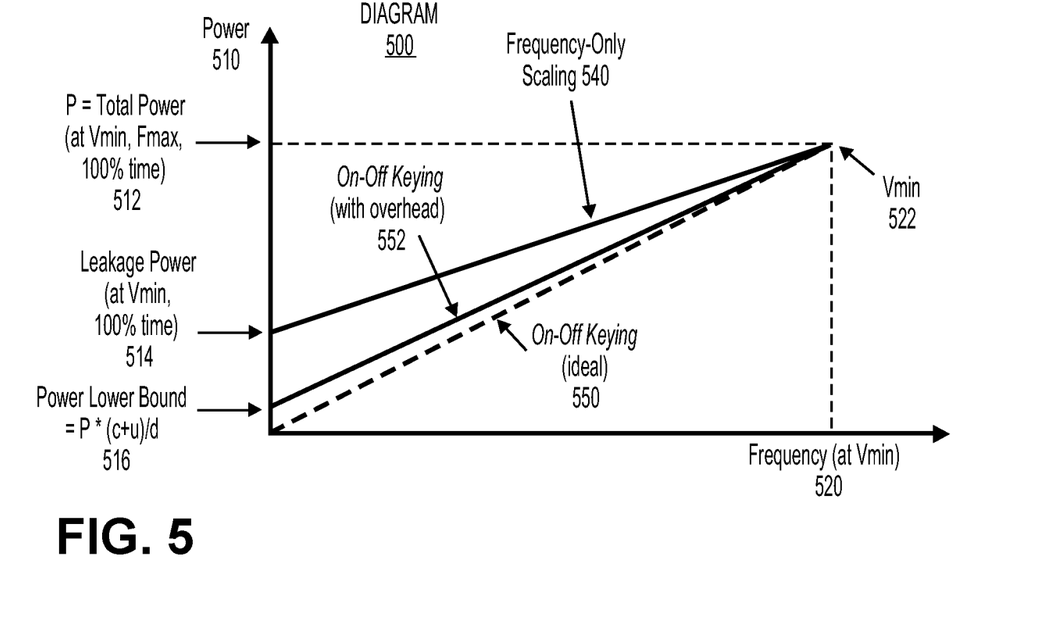
FIG. 5 illustrates a diagram of power versus frequency for one embodiment of the invention.

FIG. 5 illustrates a diagram of power versus frequency for one embodiment of the invention. The diagram 500 includes power 510 on a vertical axis and frequency 520 on a horizontal axis. The segment 540 extends from Vmin 522 to leakage power 514. A frequency only scaling method (e.g., waveform 230) is applied to generate the segment 540. A voltage frequency scaling method would be reduced to the frequency only scaling method because the voltage is fixed at Vmin. The power is reduced moderately along the segment 540 in moving from Vmin 522 to leakage power 514. However, the power can not be lowered below leakage power 514 with the frequency only scaling because the device is operating in an ON condition 100% of the time and thus has leakage 100% of this time.

The ideal ON-OFF keying segment 550 extends from Vmin 522 to zero. The ON-OFF keying method (e.g., waveform 240, 250) is applied to generate the ideal segment 550. The power is reduced significantly along the segment 550 in moving from Vmin 522 to zero. The ON-OFF keying segment 552 with overhead extends from Vmin 522 to power lower bound 516. The ON-OFF keying method (e.g., waveform 240, 250) is applied to generate the non-ideal segment 552 with overhead. The power is reduced significantly along the segment 552 in moving from Vmin 522 to power lower bound 516.

Thus, the ideal ON-OFF keying segment 550 and ON-OFF keying segment 552 both reduce the power consumption of a device in comparison to the frequency only scaling because the device is operating in an ON condition 100% of the time for the frequency only scaling method while the device is operating in an ON condition for a fraction of the time for the ON-OFF keying methods as illustrated by waveform 255 and diagram 500.

Figure 6:
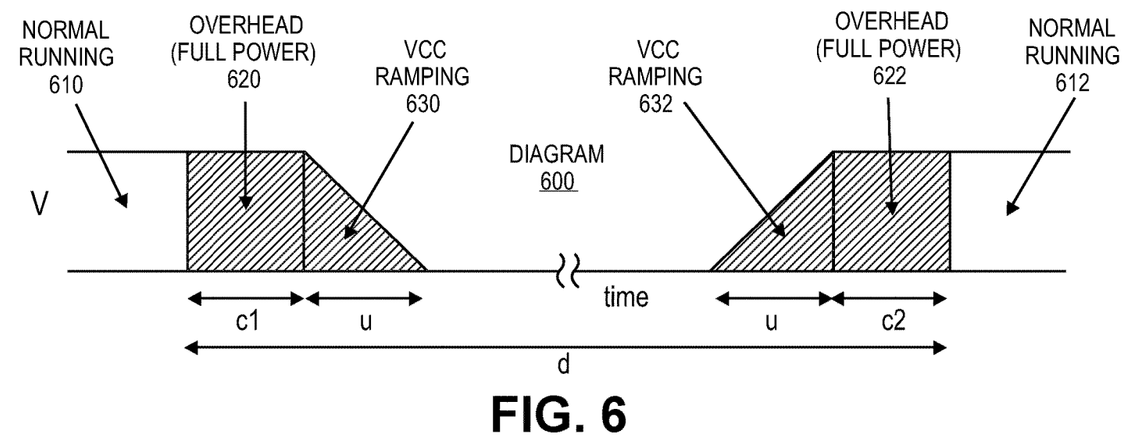
FIGS. 6 and 7 illustrate power model diagrams with overhead in accordance with one embodiment of the invention.
Figure 7:
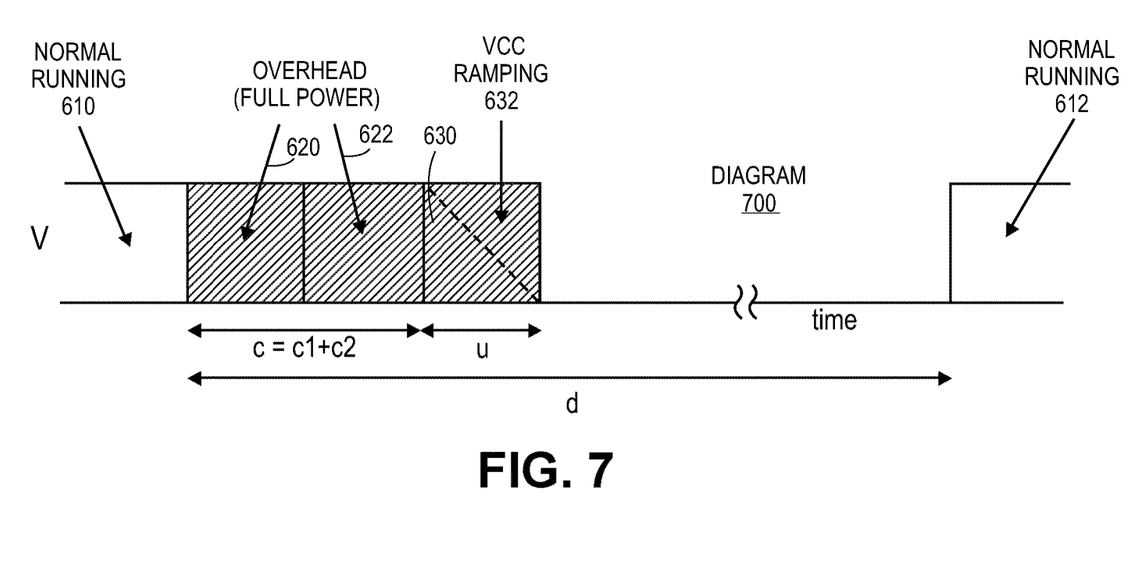

FIGS. 6 and 7 illustrate power model diagrams with overhead in accordance with one embodiment of the invention. These diagrams each have units of voltage on a vertical axis and time on a horizontal axis. The diagram 600 includes normal running portions 610 and 612, overhead (full power) portions 620 and 622 (e.g., c1 and c2), and Vcc ramping portions 630 and 632 (e.g., u). The diagram 700 includes an addition of the overhead (e.g., c1, c2) and Vcc ramping portions (e.g., u) with this being represented as c+u. The total time, d, represents the total delay from normal running portion 610 until normal running portion 612. The time delay caused by overhead and Vcc ramping is based on the technology used to implement the device. For example, the time delay is based on the time delay in switching the power gates 346-348 from open to closed and closed to open positions, which correspond to the device being in an ON or OFF condition. The device may not be performing useful functions for the user during this time delay. The power lower bound 516 of FIG. 5 is defined by the following equation:

$$\text{Power lower bound} = P*(c+u)/d$$

Figure 8:
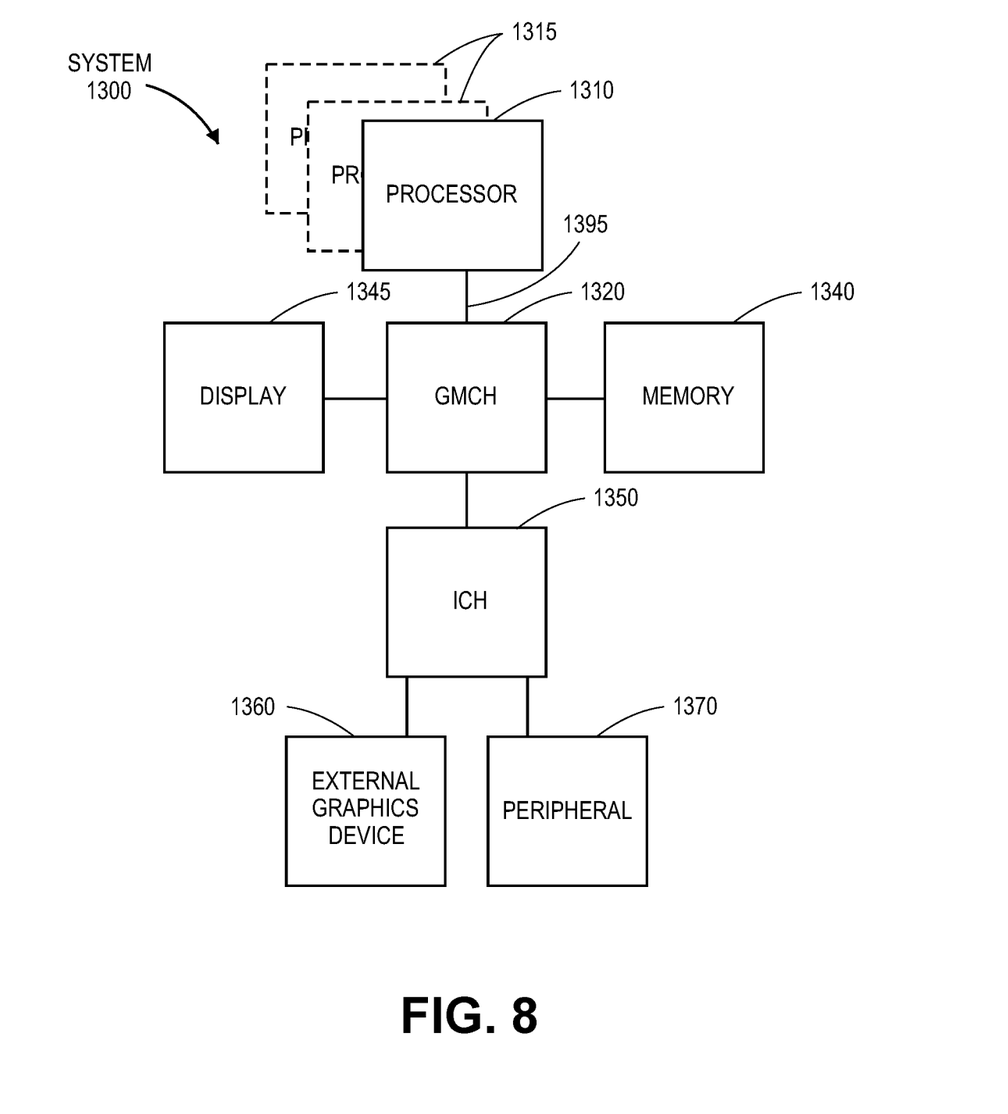
FIG. 8 is a block diagram of a system in accordance with one embodiment of the invention.

FIG. 8 illustrates a block diagram of a system 1300 in accordance with one embodiment. The system 1300 may include one or more processors 1310, 1315, which are coupled to graphics memory controller hub (GMCH) 1320. The optional nature of additional processors 1315 is denoted in FIG. 8 with broken lines. FIG. 8 illustrates that the GMCH 1320 may be coupled to the memory 1340 that may be, for example, a dynamic random access memory (DRAM). The DRAM may, for at least one embodiment, be associated with a nonvolatile cache. One or more of the processors may include a power control block 1311 having power control software for implementing embodiments of the invention.

The GMCH 1320 may be a chipset, or a portion of a chipset. The GMCH 1320 may communicate with the processor(s) 1310, 1315 and control interaction between the processor(s) 1310, 1315 and memory 1340. The GMCH 1320 may also act as an accelerated bus interface between the processor(s) 1310, 1315 and other elements of the system 1300. For at least one embodiment, the GMCH 1320 communicates with the processor(s) 1310, 1315 via a multi-drop bus, such as a frontside bus (FSB) 1395.

Furthermore, GMCH 1320 is coupled to a display 1345 (such as a flat panel display). GMCH 1320 may include an integrated graphics accelerator. GMCH 1320 is further coupled to an input/output (I/O) controller hub (ICH) 1350, which may be used to couple various peripheral devices to system 1300. Shown for example in the embodiment of FIG. 8 is an external graphics device 1360, which may be a discrete graphics device coupled to ICH 1350, along with another peripheral device 1370.

Alternatively, additional or different processors may also be present in the system 1300. For example, additional processor(s) 1315 may include additional processors(s) that are the same as processor 1310, additional processor(s) that are heterogeneous or asymmetric to processor 1310, accelerators (such as, e.g., graphics accelerators or digital signal processing (DSP) units), field programmable gate arrays, or any other processor. There can be a variety of differences between the physical resources 1310, 1315 in terms of a spectrum of metrics of merit including architectural, micro-architectural, thermal, power consumption characteristics, and the like. These differences may effectively manifest themselves as asymmetry and heterogeneity amongst the processing elements 1310, 1315. For at least one embodiment, the various processing elements 1310, 1315 may reside in the same die package.

Figure 9:
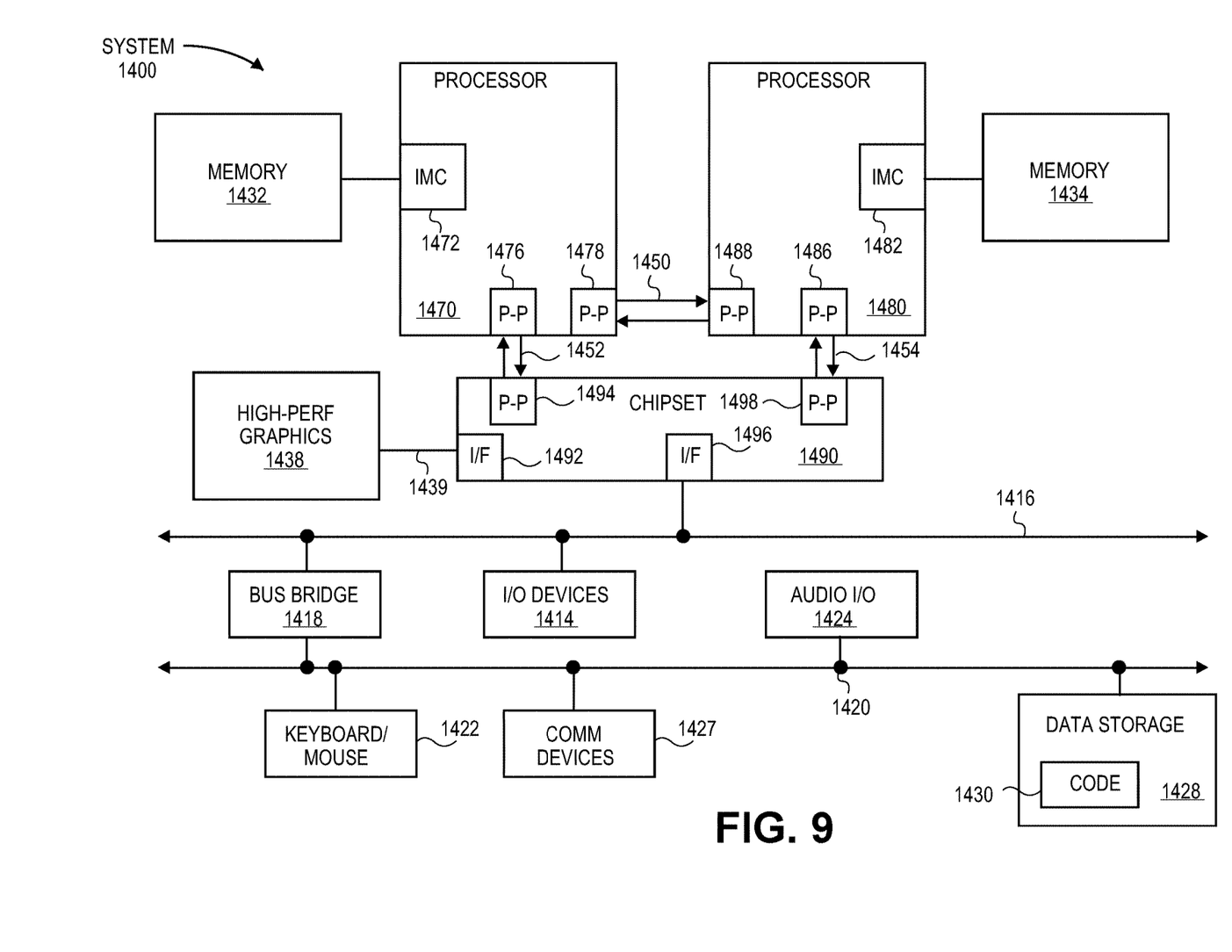
FIG. 9 is a block diagram of a second system in accordance with an embodiment of the invention.

Referring now to FIG. 9, shown is a block diagram of a second system 1400 in accordance with an embodiment of the present invention. As shown in FIG. 9, multiprocessor system 1400 is a point-to-point interconnect system, and includes a first processor 1470 and a second processor 1480 coupled via a point-to-point interconnect 1450. Alternatively, one or more of processors 1470, 1480 may be an element other than a processor, such as an accelerator or a field programmable gate array. While shown with only two processors 1470, 1480, it is to be understood that the scope of embodiments of the present invention is not so limited. In other embodiments, one or more additional processing elements may be present in a given processor. One or more of the processors may include a power control block 1411 having power control software to implement embodiments of the invention.

Processor 1470 may further include an integrated memory controller hub (IMC) 1472 and point-to-point (P-P) interfaces 1476 and 1478. Similarly, second processor 1480 may include a IMC 1482 and P-P interfaces 1486 and 1488. Processors 1470, 1480 may exchange data via a point-to-point (PtP) interface 1450 using PtP interface circuits 1478, 1488. As shown in FIG. 9, IMC's 1472 and 1482 couple the processors to respective memories, namely a memory 1442 and a memory 1444, which may be portions of main memory locally attached to the respective processors.

Processors 1470, 1480 may each exchange data with a chipset 1490 via individual P-P interfaces 1452, 1454 using point to point interface circuits 1476, 1494, 1486, 1498.

Chipset 1490 may also exchange data with a high-performance graphics circuit 1438 via a high-performance graphics interface 1439.

A shared cache (not shown) may be included in either processor outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of embodiments of the present invention is not so limited.

As shown in FIG. 9, various I/O devices 1414 may be coupled to first bus 1416, along with a bus bridge 1418 which couples first bus 1416 to a second bus 1420. In one embodiment, second bus 1420 may be a low pin count (LPC) bus. Various devices may be coupled to second bus 1420 including, for example, a keyboard/mouse 1422, communication devices 1426 and a data storage unit 1428 such as a disk drive or other mass storage device which may include code 1430, in one embodiment. Further, an audio I/O 1424 may be coupled to second bus 1420. Note that other architectures are possible. For example, instead of the point-to-point architecture of FIG. 9, a system may implement a multi-drop bus or other such architecture.

Figure 10:
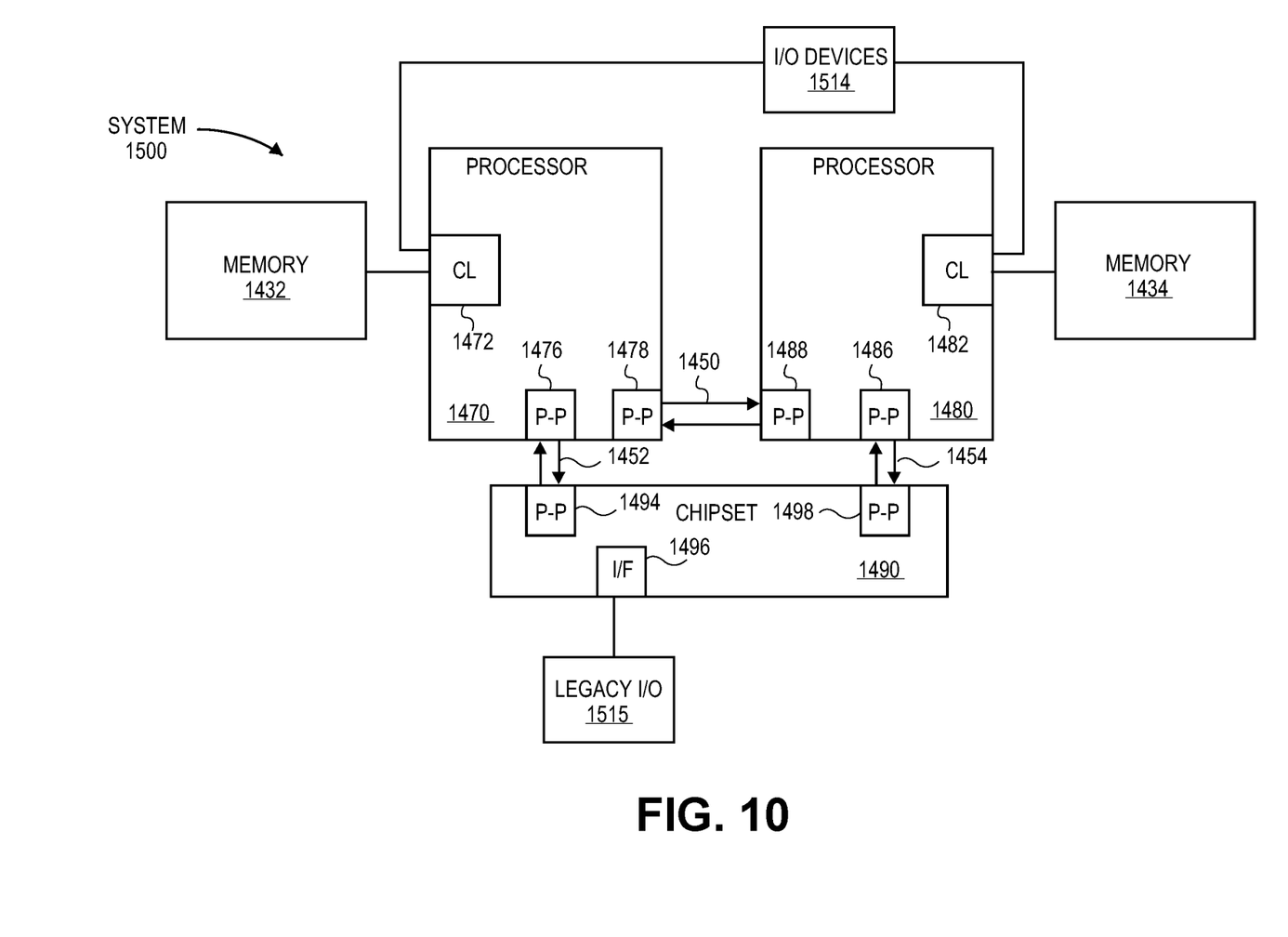
FIG. 10 is a block diagram of a third system in accordance with an embodiment of the invention.

Referring now to FIG. 10, shown is a block diagram of a third system 1500 in accordance with an embodiment of the present invention. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing elements 1470, 1480 may include integrated memory and I/O control logic ("CL") 1472 and 1482, respectively. For at least one embodiment, the CL 1472, 1482 may include memory controller hub logic (IMC) such as that described above in connection with FIG. 9. In addition, CL 1472, 1482 may also include I/O control logic. FIG. 10 illustrates that not only are the memories 1442, 1444 coupled to the CL 1472, 1482, but also that I/O devices 1514 are also coupled to the control logic 1472, 1482. Legacy I/O devices 1515 are coupled to the chipset 1490. One or more of the processing elements may include a power control block 1411 having power control software to implement embodiments of the invention.

Figure 11:
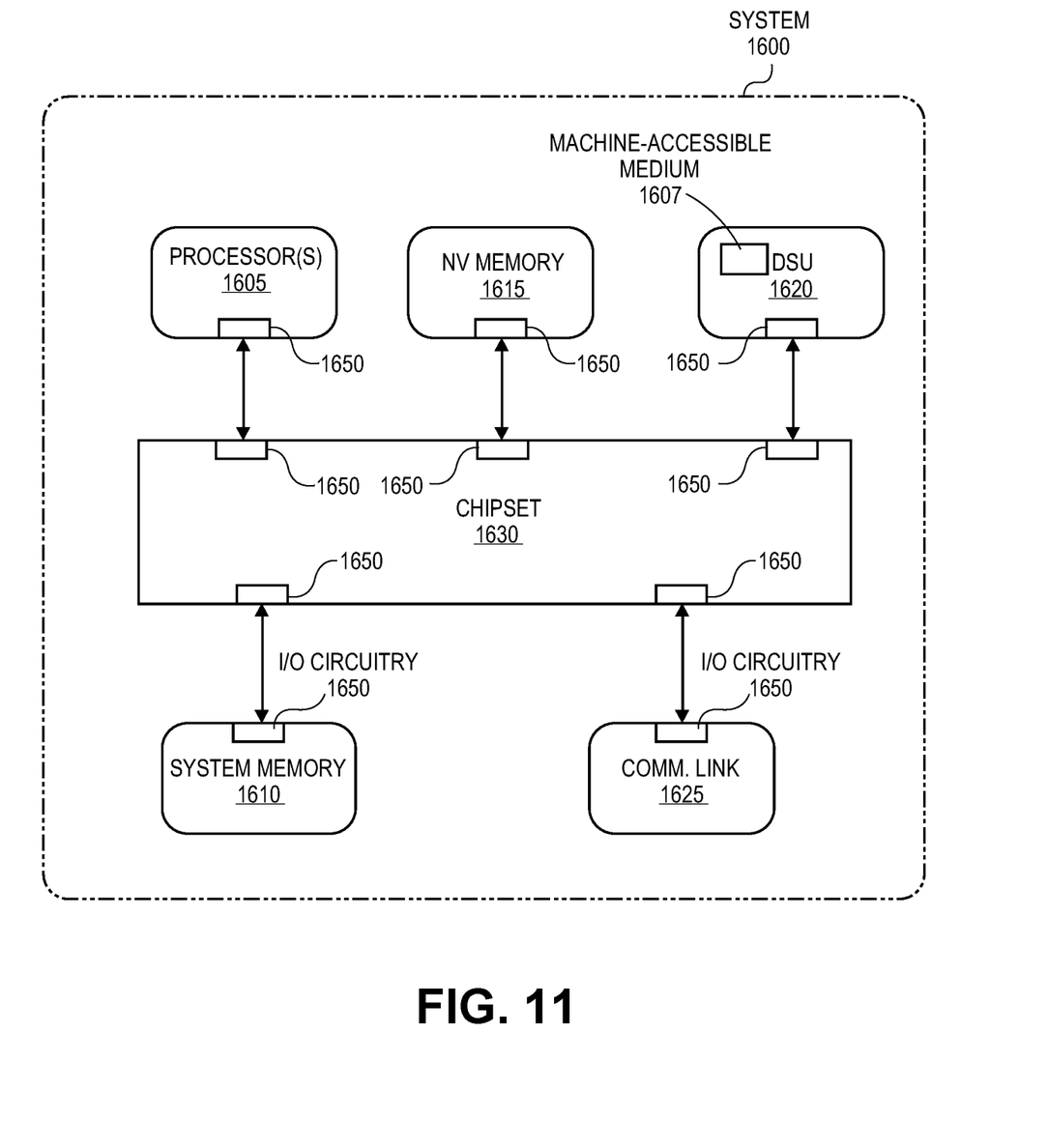
FIG. 11 illustrates a functional block diagram illustrating a system implemented in accordance with one embodiment of the invention.

FIG. 11 illustrates a functional block diagram illustrating a system 1600 implemented in accordance with one embodiment. The illustrated embodiment of processing system 1600 includes one or more processors (or central processing units) 1605 having power control block 1611 with power control software, system memory 1610, nonvolatile ("NV") memory 1615, a data storage unit ("DSU") 1620, a communication link 1625, and a chipset 1630. The illustrated processing system 1600 may represent any computing system including a desktop computer, a notebook computer, a workstation, a handheld computer, a server, a blade server, or the like.

The elements of processing system 1600 are interconnected as follows. Processor(s) 1605 is communicatively coupled to system memory 1610, NV memory 1615, DSU 1620, and communication link 1625, via chipset 1630 to send and to receive instructions or data thereto/therefrom. In one embodiment, NV memory 1615 is a flash memory device. In other embodiments, NV memory 1615 includes any one of read only memory ("ROM"), programmable ROM, erasable programmable ROM, electrically erasable programmable ROM, or the like. In one embodiment, system memory 1610 includes random access memory ("RAM"), such as dynamic RAM ("DRAM"), synchronous DRAM, ("SDRAM"), double data rate SDRAM ("DDR SDRAM"), static RAM ("SRAM"), and the like. DSU 320 represents any storage device for software data, applications, and/or operating systems, but will most typically be a nonvolatile storage device. DSU 320 may optionally include one or more of an integrated drive electronic ("IDE") hard disk, an enhanced IDE ("EIDE") hard disk, a redundant array of independent disks ("RAID"), a small computer system interface ("SCSI") hard disk, and the like. Although DSU 1620 is illustrated as internal to processing system 1600, DSU 320 may be externally coupled to processing system 1600. Communication link 1625 may couple processing system 1600 to a network such that processing system 1600 may communicate over the network with one or more other computers. Communication link 1625 may include a modem, an Ethernet card, a Gigabit Ethernet card, Universal Serial Bus ("USB") port, a wireless network interface card, a fiber optic interface, or the like.

The DSU 1620 may include a machine-accessible medium 1607 on which is stored one or more sets of instructions (e.g., software) embodying any one or more of the methods or functions described herein. The software may also reside, completely or at least partially, within the processor(s) 1605 during execution thereof by the processor(s) 1605, the processor(s) 1605 also constituting machine-accessible storage media.

While the machine-accessible medium 1607 is shown in an exemplary embodiment to be a single medium, the term "machine-accessible medium" should be taken to include a single medium or multiple media (e.g., a centralized or distributed database, and/or associated caches and servers) that store the one or more sets of instructions. The term "machine-accessible medium" shall also be taken to include any medium that is capable of storing, encoding or carrying a set of instructions for execution by the machine and that cause the machine to perform any one or more of the methodologies of embodiments of the present invention. The term "machine-accessible medium" shall accordingly be taken to include, but not be limited to, solid-state memories, optical, and magnetic media.

Thus, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

As illustrated in FIG. 11, each of the subcomponents of processing system 1600 includes input/output ("I/O") circuitry 1650 for communication with each other. I/O circuitry 1650 may include impedance matching circuitry that may be adjusted to achieve a desired input impedance thereby reducing signal reflections and interference between the subcomponents.

It should be appreciated that various other elements of processing system 1600 have been excluded from FIG. 11 and this discussion for the purposes of clarity. For example, processing system 1600 may further include a graphics card, additional DSUs, other persistent data storage devices, and the like. Chipset 1630 may also include a system bus and various other data buses for interconnecting subcomponents, such as a memory controller hub and an input/output ("I/O") controller hub, as well as, include data buses (e.g., peripheral component interconnect bus) for connecting peripheral devices to chipset 1630. Correspondingly, processing system 1600 may operate without one or more of the elements illustrated. For example, processing system 1600 need not include DSU 1620.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
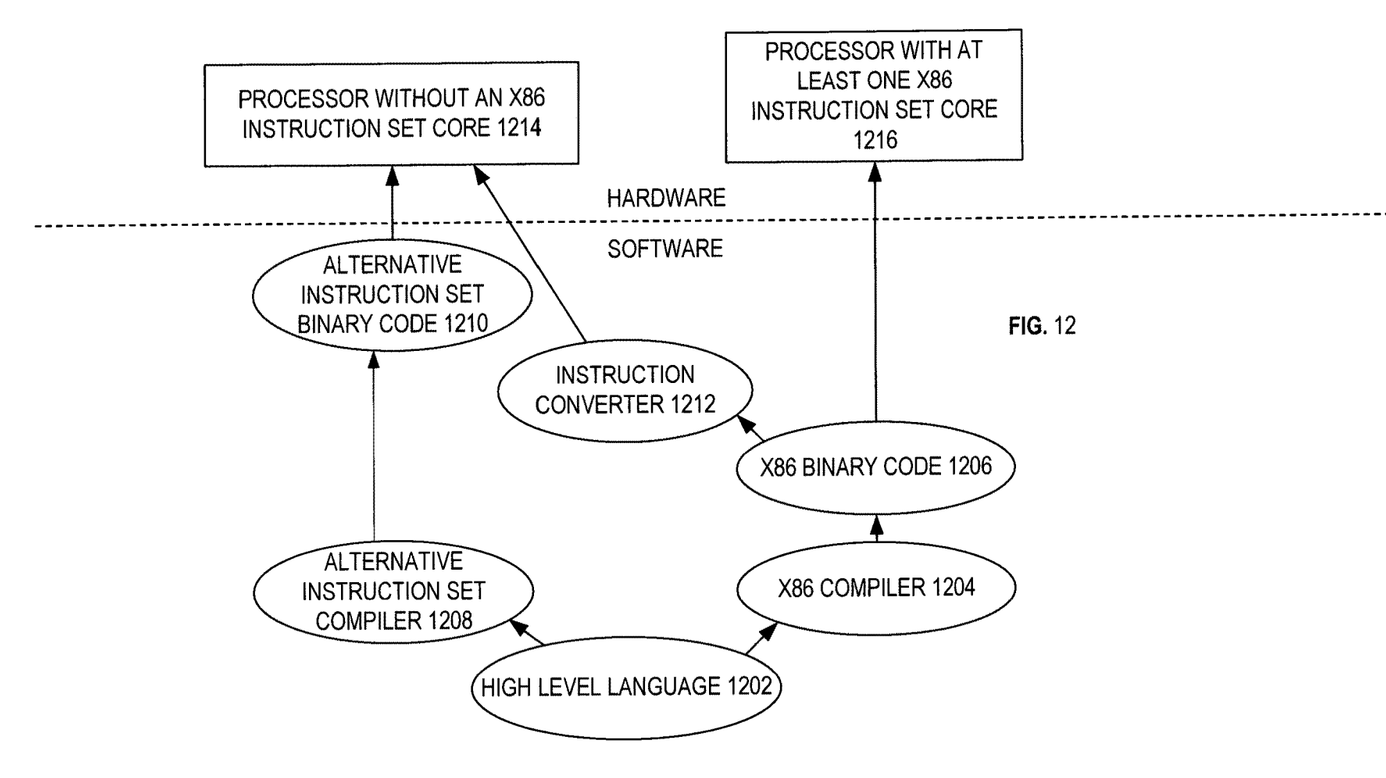
FIG. 12 is a block diagram contrasting the use of a software instruction converter to convert binary instructions in a source instruction set to binary instructions in a target instruction set according to embodiments of the invention.

FIG. 12 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 12 shows a program in a high level language 1202 may be compiled using an x86 compiler 1204 to generate x86 binary code 1206 that may be natively executed by a processor with at least one x86 instruction set core 1216. The processor with at least one x86 instruction set core 1216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1204 represents a compiler that is operable to generate x86 binary code 1206 (e.g., object code) that can, with or without additional linkage processing, be executed on the processor with at least one x86 instruction set core 1216. Similarly, FIG. 12 shows the program in the high level language 1202 may be compiled using an alternative instruction set compiler 1208 to generate alternative instruction set binary code 1210 that may be natively executed by a processor without at least one x86 instruction set core 1214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1212 is used to convert the x86 binary code 1206 into code that may be natively executed by the processor without an x86 instruction set core 1214. This converted code is not likely to be the same as the alternative instruction set binary code 1210 because an instruction converter capable of this is difficult to make; however, the converted code will accomplish the general operation and be made up of instructions from the alternative instruction set. Thus, the instruction converter 1212 represents software, firmware, hardware, or a combination thereof that, through emulation, simulation or any other process, allows a processor or other electronic device that does not have an x86 instruction set processor or core to execute the x86 binary code 1206.

In one embodiment, a processor (e.g., CPU core, processor 1310, 1315, 1470, 1480, 1605, etc.) or processing elements within the processor execute software programs or instructions including power control software. The processor includes a power control block that includes one or more blocks under power control of the power control software and one or more power gates that are coupled to the one or more blocks. The one or more power gates control an ON condition and an OFF condition for the one or more blocks of the device. The processor or at least one processing element is configured to execute instructions of the power control software to initiate ON-OFF keying to control power consumption of the power control block, to compute an actual frequency, an actual voltage, and an ON-OFF period of the ON-OFF keying for the power control block, and to set a target frequency, a target supply voltage, and a power gate control for the power control block based on the ON-OFF keying.

The processor or at least one processing element is further configured to execute instructions of the power control software to compute the target frequency for the device based on one or more inputs. The power control block further includes one or more voltage regulators to receive a voltage control input from the power control software and to provide controlled supply voltages for the device. The ON-OFF keying reduces power consumption of the power control block including the one or more blocks by alternating between the ON condition and the OFF condition.

In another embodiment, a system includes power control software to control a microcontroller and one or more blocks that are under power control of the power control software. One or more power gates are coupled to the one or more blocks. The one or more power gates switch to control an ON condition and an OFF condition for the one or more blocks. The microcontroller is configured to execute instructions of the power control software to initiate ON-OFF keying to control power consumption, to compute an ON-OFF period of the ON-OFF keying, and set a target frequency, a target supply voltage, and a power gate control for the one or more blocks based on the ON-OFF keying. The microcontroller is further configured to execute instructions of the power control software to compute a target frequency for the one or more blocks based on one or more inputs (e.g., environmental sensors, power and other hardware monitors, platform and external hardware, user input, workload, and idle monitors). One or more clock generators receive a frequency control input from the power control software and provide one or more controlled frequencies of clock signals for the one or more blocks. The ON-OFF keying reduces power consumption of the one or more blocks by alternating between the ON condition and the OFF condition. The one or more blocks may each include one or more processors or processing cores.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

What is claimed is:

1. A computer-implemented method, comprising:
    computing an ON period for power gates of the device and an OFF period for power gates of ON-OFF keying for the device during a minimum voltage (Vmin) condition; and
    setting a target frequency, a target supply voltage, and a power gate control for the device based on the ON-OFF keying.

2. The computer-implemented method of claim 1, further comprising:
    prior to computing the ON and OFF periods to be used for the ON-OFF keying, choosing the ON-OFF keying from a plurality of power control schemes including voltage frequency scaling and frequency only scaling.

3. The computer-implemented method of claim 1, wherein the power gate control comprises one or more switches to control an ON condition and an OFF condition for one or more blocks of the device.

4. The computer-implemented method of claim 1, further comprising:
    initiating power control with power control software; and
    computing the target frequency for the device based on one or more inputs.

5. The computer-implemented method of claim 1, further comprising:
    selecting a voltage frequency scaling for voltages greater than Vmin during non-Vmin conditions.

6. The computer-implemented method of claim 1, further comprising:
    prior to computing the ON and OFF periods to be used for the ON-OFF keying, monitoring one or more of workload and power using at least one monitor includes silicon age monitors.

7. A processor, comprising:
    one or more processing elements to execute instructions of power control software to provide power control for energy efficiency and energy conservation; and
    a power control block comprising,
        one or more blocks under power control of the power control software to utilize on-off modulation based on voltage and frequency conditions, and an effective target frequency;
        one or more power gates coupled to the one or more blocks, the one or more power gates to control an ON condition and an OFF condition for the one or more blocks of the device, wherein at least one processing element is to execute instructions of the power control software to control power consumption of the one or more blocks during a minimum voltage (Vmin) condition, to compute an ON period and an OFF period of the ON-OFF modulation for the one or more blocks, and, based on the ON-OFF modulation, to set a target operating condition including a target frequency and a target supply voltage and a power gate control for the one or more blocks.

8. The processor of claim 7, wherein at least one processing element is further configured to execute instructions of the power control software to compute the target operating condition including a target frequency for the power control block based on one or more inputs.

9. The processor of claim 7, wherein the power control block further comprises one or more voltage regulators to receive a voltage control input from the power control software and to provide controlled supply voltages for the one or more blocks.

10. The processor of claim 7, wherein the at least one processing element is further configured to execute instructions of the power control software to compute an actual operating condition including an actual frequency and an actual supply voltage.

11. The processor of claim 7, the power control block further comprises one or more clock generators to receive a frequency control input from the power control software and to provide one or more controlled frequencies of clock signals for the one or more blocks, wherein the ON-OFF modulation reduces power consumption of the one or more blocks by alternating between the ON condition and the OFF condition, wherein the one or more blocks while in the OFF condition eliminates or at least reduces leakage power.

* * * * *